United States Patent [19]

Smith

[11] Patent Number: 5,001,620
[45] Date of Patent: Mar. 19, 1991

[54] POWER FACTOR IMPROVEMENT

[75] Inventor: David A. Smith, Kowloon, Hong Kong

[73] Assignee: Astec International Limited, Hong Kong, Hong Kong

[21] Appl. No.: 385,662

[22] Filed: Jul. 25, 1989

[30] Foreign Application Priority Data

Jul. 25, 1988 [GB] United Kingdom ................ 8817684

[51] Int. Cl.$^5$ ........................ G05F 1/46; H02P 13/00
[52] U.S. Cl. ...................................... 363/89; 363/72; 363/124; 323/222; 323/272; 323/285
[58] Field of Search ....................... 363/89, 39, 40, 41, 363/49, 124, 65, 72; 323/222, 282, 283, 284, 285, 268, 271, 272, 901

[56] References Cited

U.S. PATENT DOCUMENTS

| | | | |
|---|---|---|---|
| 4,384,321 | 5/1983 | Rippel | 363/89 |
| 4,677,366 | 6/1987 | Wilkinson et al. | 363/89 |
| 4,719,552 | 1/1988 | Albach et al. | 363/89 |
| 4,761,725 | 8/1988 | Henze | 363/89 |
| 4,792,887 | 12/1988 | Bernitz et al. | 323/222 |

Primary Examiner—Peter S. Wong
Attorney, Agent, or Firm—McCubbrey, Bartels, Meyer & Ward

[57] ABSTRACT

A boost convertor power supply comprising an electronic switch controlling current through a boost inductance, a rectifier for charging a capacitor which accumulates the resulting boost charge from the boost inductance, and circuitry for repeatedly switching the electronic switch. A pulse width modulation circuit varies the relative on/off period of each cycle of switching to cause the peck switch current to follow a variable amplitude wave of shape corresponding to the input voltage applied to the boost converter and amplitude controlled by an error amplifier and multiplier thereby regulating the output voltage. A ramp signal generator provides for pulse width stability. An error correction circuit corrects for the difference between average current in the boost inductor and peak switch current to modify the pulse width modulation circuit to reduce distortion of the line current waveform.

19 Claims, 6 Drawing Sheets

POWER FACTOR IMPROVEMENT

This invention relates to power supplies and in particular to an improvement of the power factor of such supplies.

Conventional switch mode power supplies have a relatively low power factor, e.g. of the order of 0.65. This limits the power which can be drawn from an electrical outlet. Thus with a power factor of 0.65, a power supply can only draw 860 W from a 110 V, 12 A power outlet. By contrast if the power factor were unity, the supply could draw 1320 W from that power outlet.

An electronic power factor controlled (PFC) power supply normally comprises a boost convertor, with switch current, and hence inductor and line current, controlled to follow the sinusoidal supply voltage. A current-mode-control pulse width modulated (PWM) chip is used to control the peak switch current to follow a variable amplitude sine wave reference derived from the supply line, by varying the switch duty cycle. An error amplifier compares the DC output voltage with a DC reference, the error signal controlling the amplitude of the sine wave reference by varying the gain of a multiplier circuit. The DC output voltage is therefore regulated and the line current should therefore be sinusoidal.

However such a power supply cannot maintain a high power factor over a wide range of input voltages and load power. An input voltage range of 90 VAC to 255 VAC, and input power range of 100 W to 1000 W would require input current wave shape to be accurately controlled over the range 11.1 ARMS to 0.4 ARMS. However, the difference between average current in the boost inductor and peak switch current is an error which gives rise to distortion of the line current wave shape. The slope compensation ramp required for current-mode-control pulse width stability further increases this error.

The invention has therefore been made with these points in mind and it is an object of this invention to provide a power supply having a high power factor.

According to the invention there is provided a power supply including a boost convertor comprising an electronic switch controlling current through a boost inductance, rectifier means for charging capacitor means which accumulate the resulting boost charge from the boost inductance, means for repeatedly switching the electronic switch, pulse width modulation means for varying the relative on/off period of each cycle of switching to cause the peak switch current to follow a variable amplitude wave of shape corresponding to the input voltage applied to the boost convertor and amplitude controlled by an error amplifier and multiplier thereby regulating the output voltage, a ramp signal generator for pulse width stability, and means for correcting for the difference between average current in the boost inductor and peak switch current to modify the pulse width modulation means to reduce distortion of the line current waveform.

Such a power supply can have a high power factor and therefore can draw higher than normal loads from existing power outlets.

An advantage of the power supply according to the invention over certain previous supplies is that the present circuit senses current in the switch of the boost convertor rather than the line current itself. Therefore the switch can be protected against excessive currents and it is easier to control the feedback by current mode control, i.e. by controlling the inductor or switch current rather than the average voltage applied to the inductor.

Power supplies with a high power factor have a number of additional advantages. Thus a sinusoidal line output current puts lower stresses on the line and power supply input components than the high peak current pulses of a lower power factor power supply. Also the regulated DC generated, typically 400 V, can power the remainder of the power supply so that the power supply of the invention has the advantages that:

(a) the supply holdup time is independent of supply line voltage, and smaller energy storage capacitors can be used;

(b) the power conversion stages can be made more efficient; and (c) the supply can have universal input i.e. from 100 VAC to 240 VAC, without needing to switch between a full wave rectifier circuit for 240 VAC and a voltage doubler circuit for 110 VAC.

Further the third harmonic content of a power supply with a low power factor is high, typically 50%, and so this gives a large neutral wire current in a 3-phase power distribution system which is not normally acceptable to the utility company.

A power supply according to the invention is particularly useful in supplying power to a DC to AC invertor for driving induction loads such as an electric induction motor or fluorescent lighting. The invertor may also drive switch mode power supplies in existing equipment.

In the boost convertor of a power supply according to the invention, there is continuous inductor current. Thus, the inductor only partly discharges its energy into the output each cycle and the switching frequency can be fixed irrespective of the input voltage and output power.

In one embodiment of the invention, means are provided in series with the boost inductor to monitor the instantaneous current flow through that boost inductor, so monitoring the slope of the ripple current in the boost inductor. In this way signals can be derived which are representative of positive and negative slopes of the ripple current superimposed on the line current by the switching and those signals can then be used to provide the required correction for the difference between average current and peak switch current. The output from those means is used both to generate an error correction signal as a figure proportional to the sum of the positive and negative slopes of the ripple current plus a bias for stable control at low output levels, and to control the ramp signal generator for pulse width stability.

The signal corresponding to the negative part of the ripple, i.e. the ripple down slope, is used to create a signal controlling a ramp generator, so creating a compensation ramp signal required for stability. The components of the ramp generator are chosen so that the up slope of the compensation ramp is greater than half the inductor ripple current down slope.

The sum of the signals from the negative and positive parts of the ripple, i.e. the ripple down and up slopes, will give a waveform which is approximately proportional to the error correction required and so an integrator can be used to sum these resulting signals and provide an output used in the correction required according to the invention.

Preferably the means in series with the boost inductor is an inductor. This can be a small value inductor and should be operated within its linear region and not biased into saturation by the line current passing through it. The inductor gives an output, preferably from a separate isolated winding, corresponding to the slope of the ripple current through the boost inductor. Signals are generated from this output which are proportional to the positive and negative slopes of this ripple and used to create the error correction required according to the invention. Alternatively the inductor could be replaced with a current sensing resistor and an electronic differentiating circuit used to generate the required error correction signal.

A compensation ramp signal is added to a signal corresponding to the current through the boost convertor switch and compared with a reference voltage to control the pulse width modulator. This reference voltage is prepared as a figure proportional to the sum of the positive and negative slopes of the ripple current in the boost inductor plus a bias for stable control at low load power levels, plus a signal of shape and amplitude proportional to the desired line current.

According to one embodiment of the invention the power supply includes a boost convertor comprising an electronic switch controlling current through a boost inductance, rectifier means for charging capacitor means which accumulate the resulting boost charge from the boost inductance, means for repeatedly switching the electronic switch, pulse width modulation means for varying the relative on/off period of each cycle of switching to cause the peak switch current to follow a variable amplitude wave of shape corresponding to the input voltage applied to the boost convertor and amplitude controlled by an error amplifier and multiplier thereby regulating the output voltage, the multiplier including a comparator which switches on/off at a duty cycle determined by the error amplifier, a supplementary inductor operated within its linear region and not biased into saturation by the line current passing through it in series with the boost inductance, an output from the supplementary inductor following the slope of the ripple current caused by the switching of the boost inductor, the output from those means being used both to generate an error correction signal as a figure proportional to the sum of the positive and negative slopes of the ripple current plus a bias for stable control at low output levels, and to control a ramp signal generator for pulse width stability, and means for adding the error correction signal to the variable amplitude waveform to reduce line current distortion, and means for generating a ramp signal and adding it to the switch current signal for pulse width stability.

The negative parts of the said waveform generated across the supplementary inductor can be detected by a diode and stored on a capacitor controlling a current source comprising transistor and resistor for charging a capacitor at a linear rate, that capacitor being discharged at the end of each cycle. The charge on that capacitor can be used as the ramp signal.

The invention will now be described, by way of example, with reference to the accompanying drawings, in which.

Figure 1:
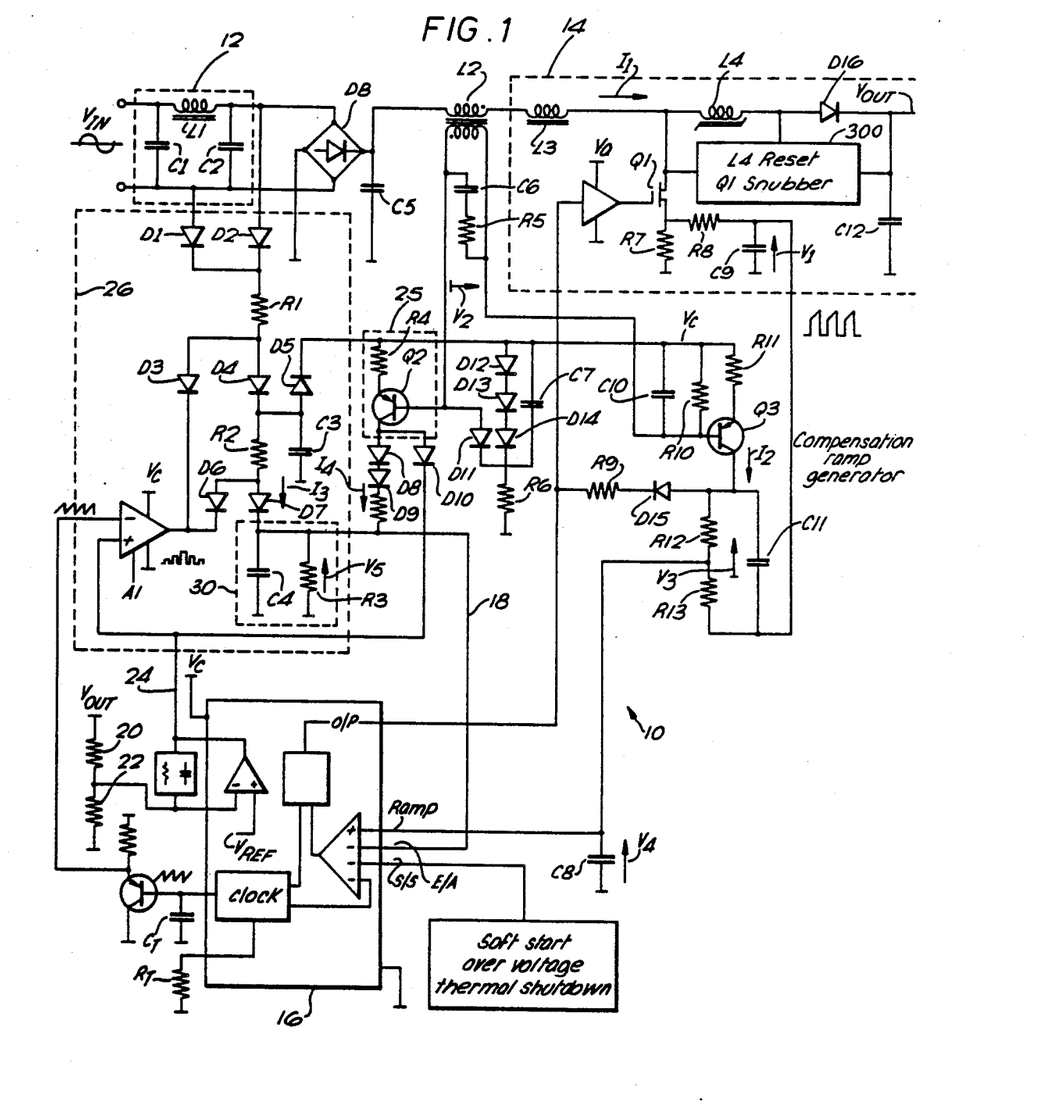
FIG. 1 is a circuit diagram of a power supply according to the invention.

Referring to FIG. 1, the power supply 10 according to the invention includes an EMI input filter arrangement 12, a rectifier bridge DB and a boost convertor 14.

The switching of the boost convertor 14 is under the control of a PWM control integrated circuit 16. The circuit 16 controls the peak switch current to follow a variable amplitude sine wave reference derived from the supply line via diodes D1 and D2 and applied to the circuit 16 by line 18. To achieve this, the circuit varies the switch duty cycle of the switch Q1. An error amplifier within the circuit 16 compares the DC output voltage derived from $V_{OUT}$ a point between resistors 20 and 22 with a DC reference voltage $V_{REF}$ and provides an error signal at line 24. This signal controls the amplitude of a sine wave reference signal by varying the gain of a multiplier circuit 26. An error correction signal generated by circuit 25 is added to the sine wave reference signal. In this way the DC output voltage $V_{OUT}$ is regulated with the object of providing a sinusoidal line current.

In the boost convertor 14, resistor R7 provides a signal $V_1$ corresponding to the instantaneous Q1 switch current. Resistor R8 and capacitor C9 act as a high frequency filter to remove from this waveform $V_1$ the leading edge spike caused by reverse recovery current in the rectifier D16. This reverse recovery current is inhibited by a saturable inductor L4 in series between the boost inductor L3 and the rectifier D16, and means 300 are provided to reset this saturable inductor L4 and snub the switch Q1. These means 300 can, for example, comprise an arrangement as described in our co-pending United Kingdom Patent Application No. 8816774.7 which corresponds to U.S. patent application Ser. No. 379,380, and reference is directed to that Application for a full description of that arrangement.

Figure 2:
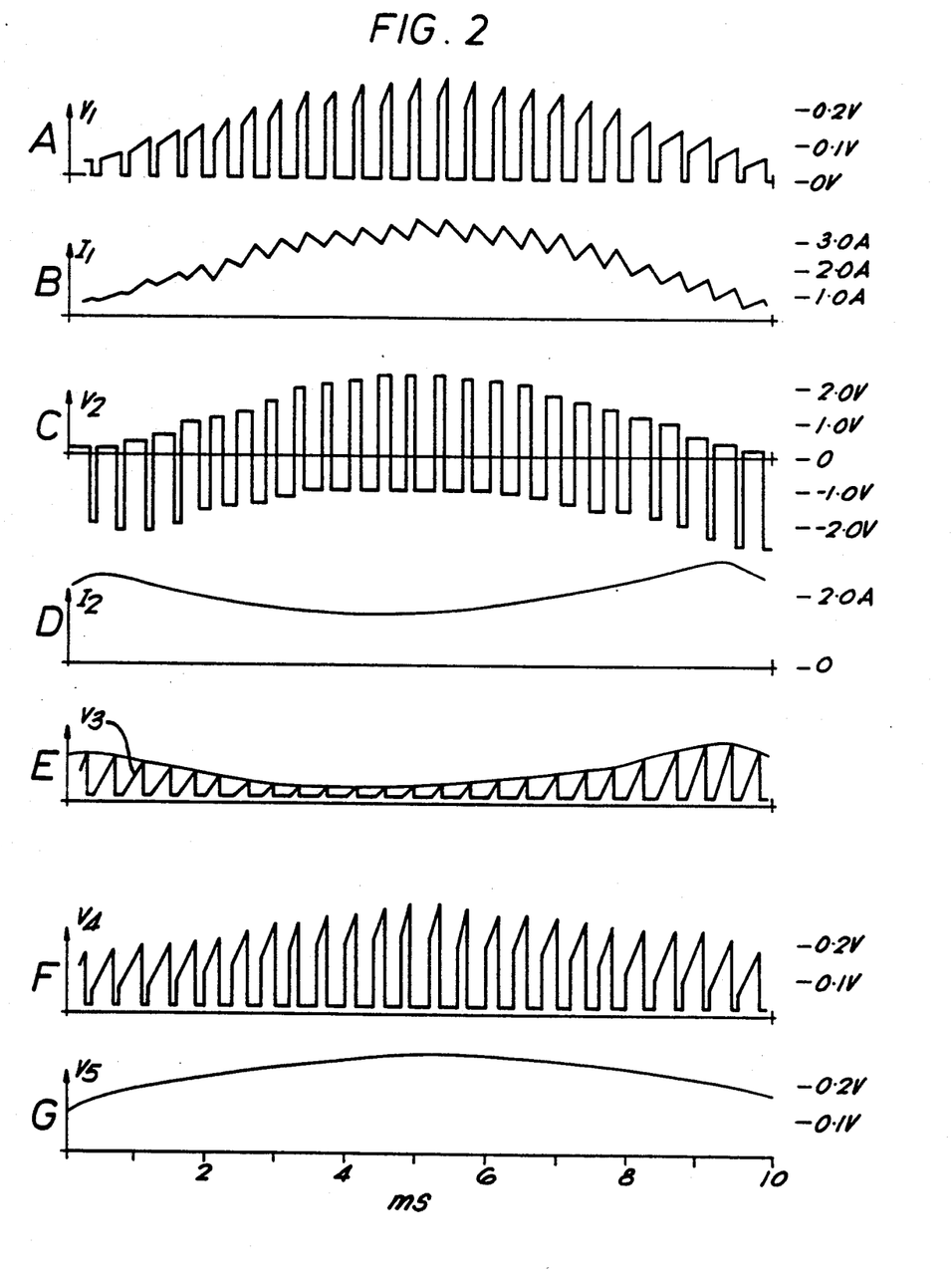
FIGS. 2 and 3 are graphs showing typical circuit waveforms at points within the circuit shown in FIG. 1.

The resulting filtered current waveform $V_1$ through the switch Q1 is shown in FIG. 2A. As can be seen the switch duty cycle can vary from 90 to 10% to 10 to 90% over a half line cycle. For clarity only 25 switching cycles per half line cycle are shown. In practice the switching frequency will be in the range of 80 to 200 KHz.

FIG. 2B shows the current in boost inductor L3. As will be seen the ripple current caused by the switching of switch Q1 is relatively large.

Figure 4:
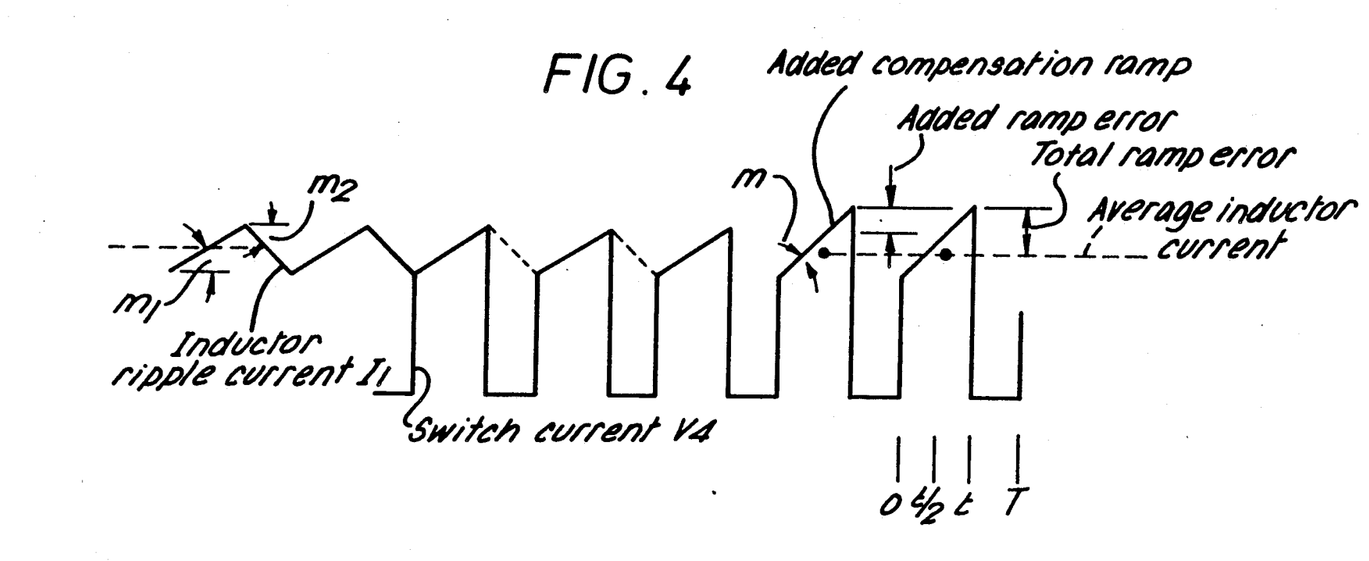
FIG. 4 is a diagram illustrating how the ramp current needs correction.

The current mode control arrangement by the circuit 16 requires a compensation ramp to be added to the switch current ramp to prevent pulse width instability when duty cycle exceeds 50%. Referring to FIG. 4, the slope m of the compensation ramp must be greater than half the inductor ripple current down slope $m_2$ for stability up to 100% duty cycle. Too much slope results in less accurate control over the switch and inductor currents.

The inductor ripple current down slope $m_2$ is:

$$m_2 = (V_{OUT} - V_{IN})/L.$$

A swinging choke must be used in a power factor controlled power supply to keep inductor current continuous and controllable down to low input current; $m_2$ is therefore dependent on input voltage and input current.

To avoid problems of trying to predict this down slope indirectly, it is measured directly by including a small inductor L2 in series with the boost inductor L3. The ripple current through this inductor will produce positive and negative voltages corresponding to the positive and negative slopes of the ripple current. These voltages are obtained as an isolated output $V_2$ from a small separate winding on the inductor L2 and this isolated output $V_2$ is shown in FIG. 2C.

The core of the inductor L2 is biased by line current. It is kept within its linear region by:
(a) gapping a ferrite core
(b) cancelling the bias with another winding; or
(c) using the inherent gap of an iron dust core.

Option c is preferred since it is the lowest cost.

A negative part of output $V_2$ generated by ripple current down slope is detected by diode D11 and stored on capacitor C10, controlling a current source comprising transistor Q3 and resistor R11, and hence the slope of a ramp voltage $V_3$ shown in FIG. 2E across a capacitor C11. Capacitor C11 is discharged at the end of each switch cycle by a resistor R9 an diode D15.

A diode chain composed of diodes D12, D13 and D14 adds a DC bias voltage to voltage $V_2$, which over corrects for voltage drop across the diode D11 and the forward biased base-emitter junction of transistor Q3.

Component values of resistor R11, R12 and R13 are chosen to give:

$$m = 0.5m_2 + A$$

where A is a small amount of extra slope to ensure pulse width stability under practical conditions.

FIG. 2D shows how the current source comprising transistor Q3 and resistor R11 varies over a half line cycle in response to changing ripple current down slope seen in FIG. 2B.

FIG. 2F shows a fraction of the ramp voltage $V_3$ added to the waveform $V_1$ to give a waveform $V_4$, i.e. the switch current plus compensation ramp.

The control IC 16 controls the pulse width by turning switch Q1 off when the waveform $V_4$ exceeds a reference voltage $V_5$ which is generated as described below. (see FIG. 2G).

Figure 3:
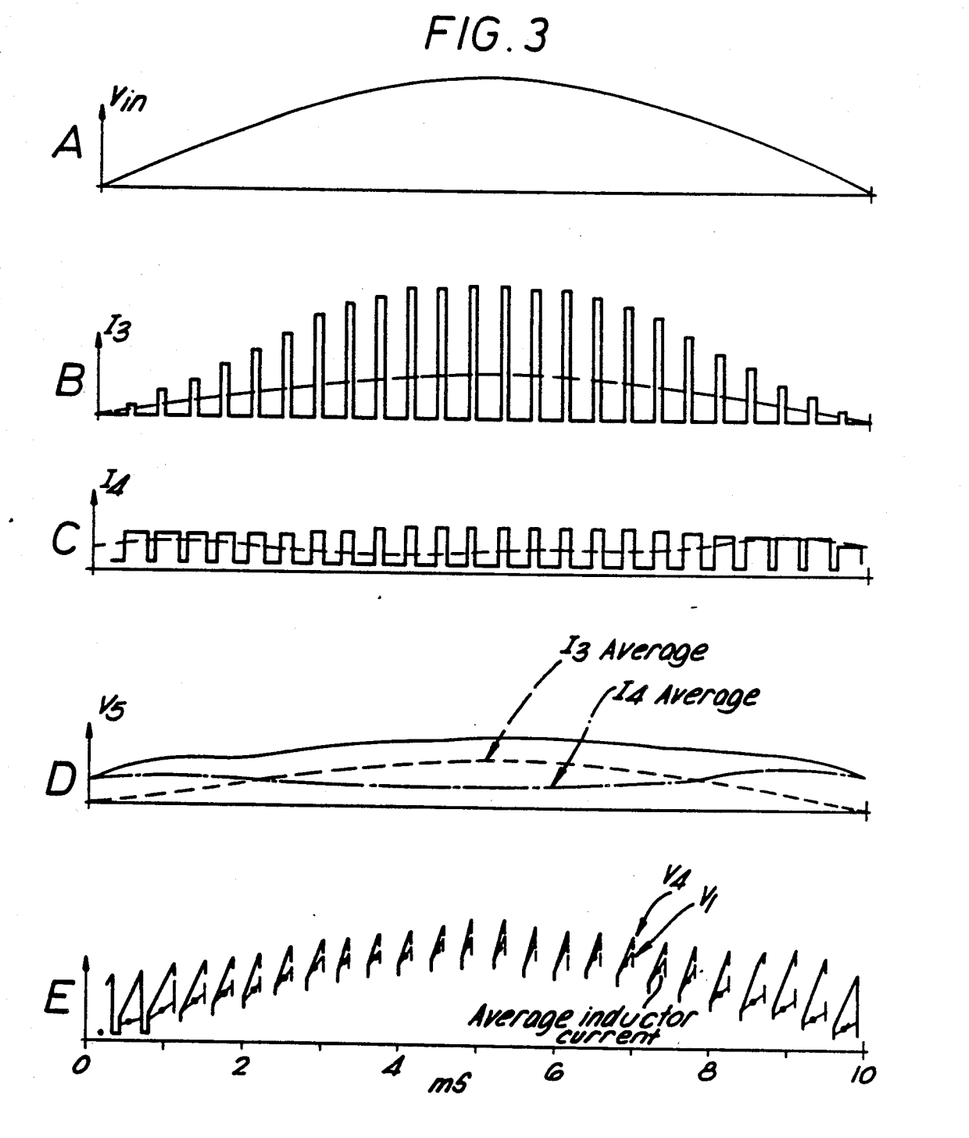

The multiplier 26 includes comparator A1 which has an open collector output which switches ON/OFF at a duty cycle determined by the output voltage of the error amplifier within the circuit 16. The line voltage generates a rectified sinusoidal current in a resistor R1, which is alternately switched either via a diode D4 into a capacitor C3, or via diode D3 into the comparator. A resistor R2 and capacitor C3 integrate the current pulses to re-generate a rectified sine wave of amplitude inversely proportional to the output duty cycle of the comparator A1. If output voltage $V_{OUT}$ low, the error amplifier output will increase, comparator A1 output will be low on a shorter duty cycle, and the voltage across capacitor C3 will be higher. Resistor R2, diodes D6 and D7, capacitor C4 and resistor R3 function in exactly the same way as resistor R1, diodes D3 and D4, capacitor C3 and resistor R2. If the resulting current $I_4$ shown in FIG. 3C from the error correction circuit is ignored or assumed to be zero, the multiplier output voltage across capacitor C4 will be a rectified sine wave of amplitude controlled by the square of the duty cycle of comparator A1.

FIG. 3A shows a half cycle of the voltage $V_{IN}$ applied to the power supply, whilst FIG. 3B shows current pulses through diode D7 into capacitor C4 resistor R3, with the re-generated sine wave voltage across capacitor C4 shown by a dashed line.

An advantage of this two stage multiplier circuit is that the total dynamic range is the product of the range of each stage, i.e. much higher than one stage, and so the reference voltage and hence the line current can be accurately controlled over a wide range. A disadvantage is the effect of a square law on total loop gain. The system unity gain frequency will change over a wider range making loop stability harder to control but the circuit 10 can cope with this and so the advantage outweighs the disadvantage.

Alternatively a single step multiplier can be used. Diodes D6 and D7, resister R2 and capacitor C3 would then be eliminated and diode D4 connected directly to capacitor C4.

The multiplier 26 is designed to operate over a wide range of input voltage and gain so that $V_{IN}$ need not be a preselected input.

With prior simple current mode control circuits, the peak of the slope compensated switch current is designed to follow a sine wave.

The lower part of FIG. 4 however demonstrates how the difference between peak and average current control is an error which distorts an otherwise sinusoidal line current, the dots representing average inductor L3 current. This distortion is made worse by the added compensation ramp. The pulse width, down slope, and therefore added ramp error are greatest when close to line zero crossing.

As can be seen the error due to ripple current is $0.5m_1 t$, and the error due to the added ramp is $mt$.

If $m=0.5m_2+A$, then total ramp error $=(0.5m_1+0.5m_2+A)t$.

The slope measuring inductor L2 measures $m_1$ and $m_2$, switch pulse width t, and also drives a circuit which generates m. Therefore the slope measuring inductor L2 output contains all the information necessary to deduce the total ramp error. Accordingly a voltage equal to the total ramp error can be generated and added to the sine wave reference.

Sine wave reference + total ramp error
= peak controlled voltage
= average inductor current + total ramp error The average inductor current (and line current) will be a sine wave. The scaling factor 0.5 in the relation $m=0.5m_2+A$ is deliberately chosen to simplify the ramp error correction circuit.

The error correction circuit 25 includes a transistor Q2 and resistor R4. It is therefore very simple but does add an error voltage to the multiplier sine wave which is close to the desired total ramp error voltage.

The inductor L2 generates positive and negative voltages proportional to $m_1$ and $m_2$, the negative voltage being stored in capacitor C10. Inductor L2 switches circuit 25 between two levels. The low level is a constant value related to the bias chain made up of diodes D12 to D14. The high level is an increase in current proportional to the peak to peak voltage swing of inductor L2, i.e. $m_1+m_2$. FIG. 3C shows the current through the current source of circuit 25, the increase in peak current at line peak is due to the inductance of the boost inductor reducing with line current and consequent increase in ripple current.

The voltage across an integrator 30 composed of capacitor C4 and resistor R3 due to the circuit 25 is proportional to $(m_1+m_2) t+B$, where B is a constant due to the low level bias. This voltage can be scaled by suitable choice of resistor R4 to be almost equal to the required total ramp error voltage.

Total ramp error $=(m_1+m_2+2A)t/2$

Error correction voltage is proportional to $$(m_1+m_2+B)t+B(T-t),$$

constants A and B being small compared with $(m_1+m_2)$.

Therefore the error correction voltage can be made to follow closely the total ramp error.

The integrator 30 sums and integrates current pulses of currents $I_3$ and $I_4$ to give a waveform $V_5$. This is a sine wave plus total ramp error and is shown in FIG. 3D.

FIG. 3E shows switch current+compensation ramp signal $V_4$ with its peak controlled to follow the waveform $V_5$. The average inductor current is also plotted by the line of the dots and it will be noted that this is a good approximation to the sine wave of the voltage $V_{IN}$ shown in FIG. 3A. The small DC bias of $I_4$ is necessary for stable control at low load power levels.

As load power is reduced, the error amplifier output voltage will drop, reducing the multiplier gain towards zero. Diodes D8, D9 and D10 then allow the error amplifier to further reduce waveform $V_5$ by diverting current $I_4$ away from the integrator 30 in a smooth manner towards the limit case of where $V_5$ is zero.

If current $I_4$ had no DC bias and the load conditions required the error amplifier to reduce waveform $V_5$ to zero, the boost convertor would stop, voltage $V_2$, and current $I_2$ and $I_4$ would also be zero. The error amplifier output would then have to rise up to the voltage level where the multiplier has non-zero gain and current $I_3$ can flow. The boost convertor would re-start, current $I_4$ would be turned on, and waveform $V_5$ would increase to a higher value than required. Since the error amplifier cannot smoothly increase the waveform $V_5$ from zero, the system would be unstable.

In the circuit 10 however, $I_4$ has a DC bias, and so the error amplifier can control a small increase in waveform $V_5$ from zero, and hence maintain loop control over small changes in load power from zero.

Figure 5A:
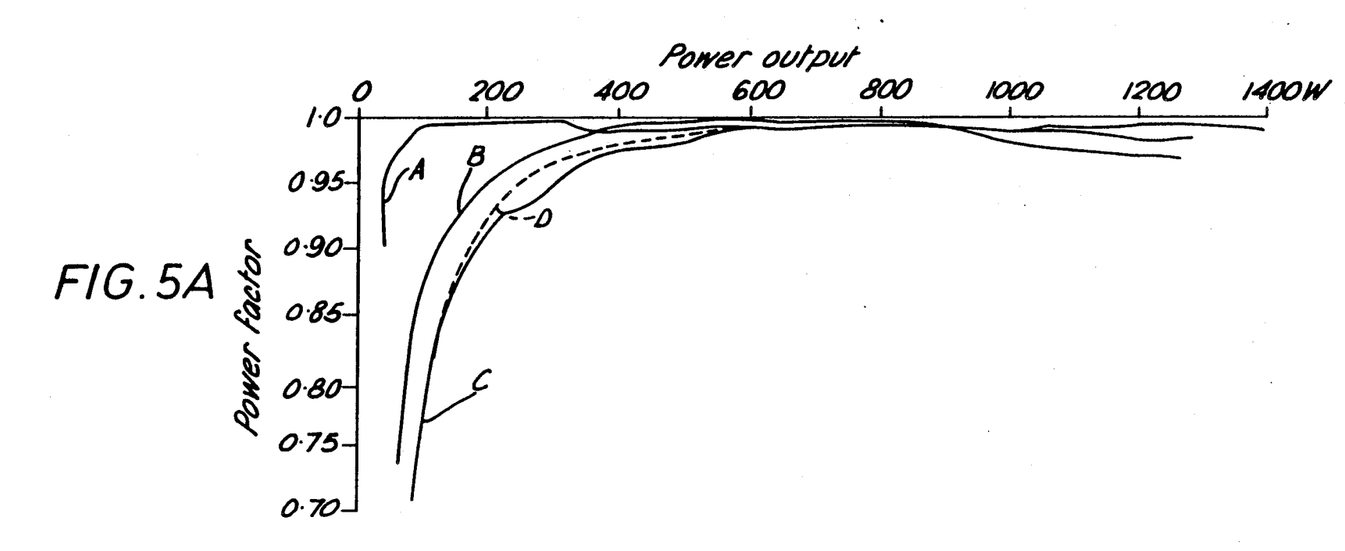
FIGS. 5A and 5B are graphs showing the performance of a circuit as shown in FIG. 1.
Figure 5B:
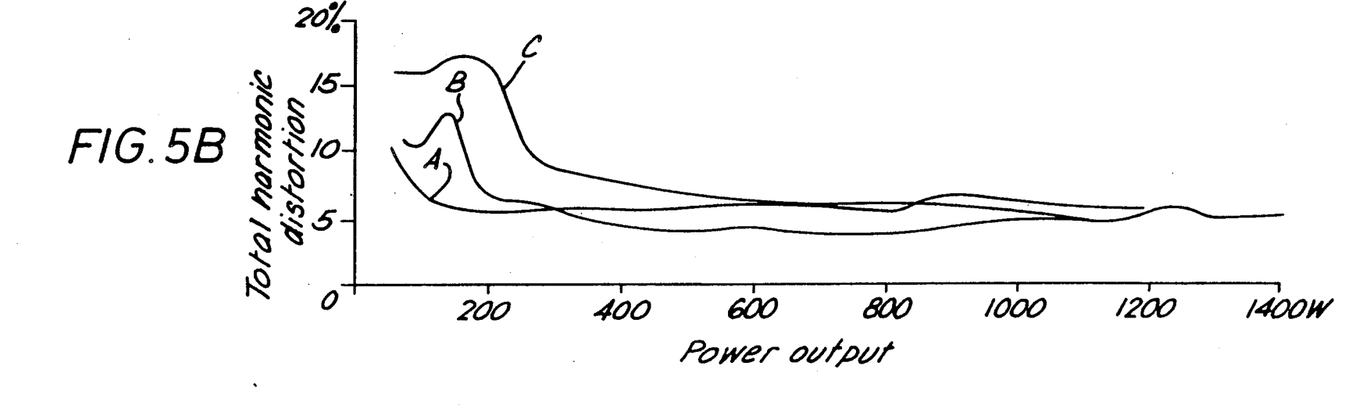

The circuit 10 of the power supply 10 according to the invention was tested at various input voltages $V_{IN}$ and loads and the results are shown in FIGS. 5A and 5B.

FIG. 5A is a plot of power factor against input power in watts for three different input line voltage $V_{IN}$:
A—240 VAC; 50 Hz
B—200 VAC; 50 Hz
C—100 VAC; 60 Hz.

Also plotted is a line marked D which is the theoretical curve for an input voltage of 240 VAC driving a 4.7 F capacitor in parallel with a resistor load.

As can be seen there is a drop in power factor at light load and this is mainly due to the capacitive current flowing in the EMI filter capacitors C1, C2, C5. However at loads of 200 W and above the power factor reaches at least 0.90 and exceeds 0.95 at 400 W and above, i.e. under normal reasonable loads, and in any case it is obviously more important for the power factor to be high at high loads so as to draw the minimum current from the power source.

FIG. 5B shows a plot of total harmonic distortion of the line current out against input power and again it will be seen that the distortion is reasonable at loads over 200 to 400 W.

A power amplifier was used to generate a stable, relatively pure sinusoidal line voltage for the above measurements.

As an example, at a supply voltage of 240 VAC, relatively high impedance and 2% total harmonic distortion, the power supply 10 gave a 0.98 power factor and 8% total harmonic distortion line current at an output of 500 W.

Figure 6:
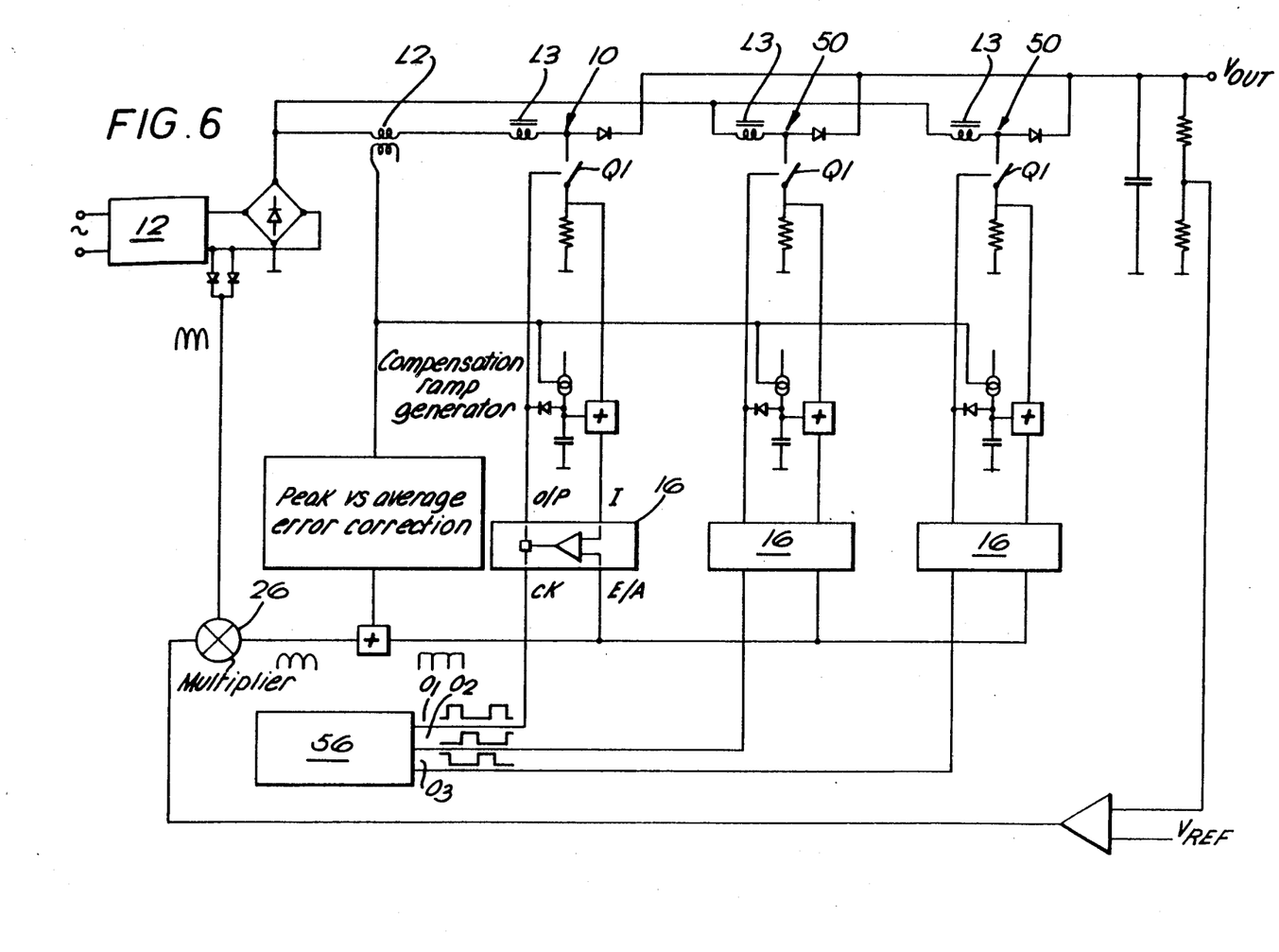
FIG. 6 is a circuit diagram of a power supply according to the invention with one or more slave boost convertors in parallel with a master boost convertor.

The power handling capacity of a power factor controlled power supply circuit according to the invention can be extended as shown, for example in FIG. 6 by connecting one or more slave boost convertors 50 in parallel with a master boost convertor 10 as described above. Where appropriate equivalent parts in FIG. 6 are given the same reference numerals as in FIG. 1. The error corrected sine wave reference signal is fed to all pulse width modulators 16 causing all boost convertors 50 and 10 to share current equally, and therefore deliver equal power to the output.

A master oscillator 56 provides clock signals for synchronisation. The equal phase angles between clock signals (and therefore switch currents) results in some cancellation of the ripple currents drawn by the boost inductors 13 from the input. The frequency of the remaining ripple current is equal to the oscillator frequency multiplied by the number of phases. The size of the EMI filter 12 required for this multiphase system is therefore much smaller than that required for a single phase system.

I claim:

1. A power supply including a boost convertor comprising an electronic switch for controlling current through a boost inductance, rectifier means for charging capacitor means which accumulate the resulting boost charge from the boost inductance, means for repeatedly switching the electronic switch, means for measuring the current conducted through said electronic switch and for generating a switch current signal related to the measured current through said electronic switch, pulse width modulation means responsive to said switch current signal for varying the relative on-/off period of each cycle of switching to cause the peak switch current to follow a variable amplitude waveform of shape corresponding to the input voltage applied to the boost convertor and amplitude controlled by an error amplifier and multiplier thereby regulating the output voltage, the multiplier including a comparator which switches on/off at a duty cycle determined by the error amplifier, a supplementary inductor operated within its linear region and not biased into saturation by the line current passing through it in series with the boost inductance, an output from the supplementary inductor following the slope of the ripple current caused by the switching of the boost inductance, the output of said supplementary inductor being used both to generate an error correction signal having a value proportional to the sum of the positive and negative slopes of the ripple current plus a bias for stable control at low output levels and to control a ramp signal generator for pulse width stability, means for adding the error correction signal to the variable amplitude waveform to reduce line current distortion, and means for generating a ramp signal and adding it to the switch current signal for pulse width stability.

2. A power supply as claimed in claim 1 in which negative parts of the waveform at said output of the supplementary inductor are detected by a diode and stored on a first capacitor controlling a current source comprising a transistor and a resistor for charging a second capacitor at a linear rate, said second capacitor being discharged at the end of each cycle.

3. A power supply as claimed in claim 1 in which the multiplier is a two-stage multiplier whose dynamic range is the product of the range of each stage.

4. A power supply as claimed in claim 1 wherein said boost convertor comprises a master boost converter, said power supply further comprising one or more slave boost convertors, each said slave boost convertor connected in parallel with said master boost convertor, each said slave boost convertor including a slave boost inductance, a slave electronic switch for controlling current through said slave boost inductance, slave rectifier means for directing the energy stored in said slave boost inductance towards the output of said power supply, means for measuring the current conducted through said slave electronic switch and for generating a slave switch current signal related to the measured current through said slave electronic switch, means for repeatedly switching said slave electronic switch, and slave pulse width modulation means responsive to said slave switch current signal for varying the relative on-/off period of each cycle;

each said slave pulse width modulation means further responsive to the sum of said error correction signal and said variable amplitude waveform of said power supply; and wherein said power supply further comprises a master oscillator providing clock signals to said pulse width modulation means and each said slave pulse width modulation means for synchronizing said master boost converter and said one or more slave boost convertors, said master oscillator providing equal phase angles between said clock signals.

5. An alternating-current to direct-current power convertor having an input port, an output port, and an output voltage reference, said power convertor regulating the voltage at said output port with respect to said output voltage reference, comprising:

a boost convertor including a boost inductor coupled to said input port for storing electrical energy, an electronic switch for controlling the current through said boost inductor, and a rectifier means for directing electrical energy from said boost inductor to said output port;

means for repeatedly switching said electronic switch in cycles, each cycle having an on-period when said electronic switch is conducting current and an off-period when said electronic switch is not conducting current, said means including pulse width modulating means for varying the amount of the on-period and the off-period in each said switch cycle;

monitoring means for measuring the current conducted through said electronic switch and for generating a switch current signal related to the measured current through said electronic switch;

reference comparison means for generating an error voltage signal related to the difference between the voltage at said output port and said output voltage reference;

means for generating a line voltage reference signal, said line voltage reference signal having a waveform shape related to the voltage at said input port and having an amplitude related to the value of said error voltage signal;

means for measuring the difference between the peak value of current through said electronic switch and the average value of current through said boost inductor and for generating an error-correction signal related to said difference in peak and average values; and means for summing said error-correction signal and said line voltage reference signal to produce an error-corrected line voltage reference signal, said pulse width modulating means responsive to said error-corrected line voltage reference signal and to said switch current signal, said pulse width modulating means beginning each cycle with an on-period and switching to an off-period when said switch current signal exceeds said error-corrected line voltage reference signal, said pulse width modulating means thereby regulating the voltage at said output port to said output voltage reference and reducing the distortion of the line current waveform at said input port with respect to the line voltage waveform at said input port.

6. The power convertor of claim 5 wherein said boost inductor has a ripple-up current during said on-period where the current though said boost inductor increases and a ripple-down current during said off-period where the current through said boost inductor decreases.

7. The power convertor of claim 6 wherein said means for measuring the difference between the peak value of switch current and the average value of boost-inductor current includes means for measuring the slope of the ripple-up current and the slope of the ripple-down current in said boost inductor, said error-correction signal generating means including means for generating said error-correction signal as a function of the sum of said slope of the ripple-up current and said slope of the ripple-down current.

8. The power convertor of claim 7 wherein said error-correction signal generating means further includes means for generating said error-correction signal as a function of the sum of said slope of the ripple-up current, said slope of the ripple-down current, and a small bias value for control during low output current levels.

9. The power convertor of claim 10 wherein said means for measuring the difference between the peak value of current through said electronic switch and the average value of current through said boost inductor measures said difference during each said switching cycle.

10. The power convertor of claim 7 wherein said means for measuring the difference between the peak value of current through said electronic switch and the average value of current through said boost inductor measures said difference during each said switching cycle.

11. The power convertor of claim 6 further comprising:

stabilizing means for providing pulse-width stability in controlling said electronic switch, said stabilizing means comprising a compensation ramp generator providing a compensation ramp signal within each said switching cycle related to one half of the slope of the ripple-down current, said stabilizing means further comprising means for adding said compensation ramp signal to said switch current signal, thereby modifying the action of said pulse width modulating means.

12. The power convertor of claim 7 wherein said means for measuring the slope of the ripple-up current and the slope of the ripple-down current comprises a supplementary inductor having a first winding connected in series with said boost inductor and a second winding for providing a measure of the current through said boost inductor as a potential difference across said second winding.

13. The power convertor of claim 12 where said supplementary inductor is operated within its linear region and not biased into saturation by the current passing through its first and second windings.

14. The power convertor of claim 7 wherein said means for measuring the slope of the ripple-up current and the slope of the ripple down current comprises:
   a current-sensing resistor connected in series with said boost inductor for measuring the current through said boost inductor; and
   an electronic differentiating circuit coupled to said current-sensing resistor for generating a signal related to the slope of the ripple-up and ripple-down currents in said boost inductor.

15. The power convertor of claim 11 wherein said compensation ramp generator comprises:
   means for receiving the value of the slope of the ripple-down current, said means for receiving including a detection diode;
   a first capacitor for storing the value of the slope of the ripple-down current in the form of a voltage;
   a second capacitor including a first terminal and a second terminal;
   current-source means for charging said second capacitor during the on-period of each cycle such that the potential difference across said second capacitor increases at a rate proportional to the voltage on said first capacitor during the on-period of each cycle;
   means for discharging said second capacitor during the off-period of each cycle such that the potential difference across said second capacitor decreases to a predetermined value;
   a voltage-dividing circuit connected across said second capacitor comprising a node, a first resistor connected between said node and said first terminal of said second capacitor, and a second resistor connected between said node and said second terminal of said second capacitor, said voltage-dividing circuit providing said compensation ramp at said voltage-dividing circuit node.

16. The power convertor of claim 15 wherein said current-source means of said compensation ramp generator comprises:
   a voltage supply;
   a transistor including a base terminal coupled to said first capacitor, a collector terminal connected to said first terminal of said second capacitor, and an emitter terminal; and
   a bias resistor connected between said transistor emitter terminal and said voltage supply.

17. The power convertor of claim 5 wherein said means for generating said line-voltage reference waveform comprises:
   means for generating a rectified-line signal proportional to the absolute value of the voltage at said input port; and
   multiplication means responsive to said rectified-line signal and to said output of said reference comparison means for generating said line-voltage reference waveform in proportion to the product of said rectified-line signal and said reference comparison means output.

18. The power convertor of claim 17 wherein said multiplication means comprises two stages of multiplication and wherein said line-voltage reference waveform is provided in proportion to the square of the product of said rectifier-line signal and said output-voltage error signal.

19. A power supply as claimed in claim 5 wherein said boost convertor comprises a master boost converter, said power supply further comprising one or more slave boost convertors, each said slave boost convertor connected in parallel with said master boost converter, each said slave boost convertor including a slave boost inductor coupled to said input port of said power supply for storing electrical energy, a slave electronic switch for controlling the current through said slave boost inductor, and a rectifier means for directing electrical energy from said slave boost inductor to said output port of said power supply, monitoring means for measuring the current conducted through said slave electronic switch and for generating a slave switch current signal related to the measured current through said slave electronic switch, and means for repeatedly switching said slave electronic switch in cycles, each slave switching cycle having an on-period when said slave electronic switch is conducting current and an off-period when said slave electronic switch is not conducting current, said means including slave pulse width modulating means for varying the amount of the on-period and the off-period in each said slave switching cycle;
   each said slave pulse width modulating means responsive to said error-corrected line voltage reference signal of said power supply and to said slave switch current signal, said slave pulse width modulating means beginning each slave switching cycle with an on-period and switching to an off-period when said slave switch current signal exceeds said error-corrected line voltage reference signal; and
   and wherein said power supply further comprises a master oscillator providing clock signals to said pulse width modulation means and each said slave pulse width modulation means for synchronizing said master boost converter and said one or more slave boost convertors, said master oscillator providing equal phase angles between said clock signals, said pulse width modulating means and said slave pulse width modulating means thereby regulating the voltage at said output port to said output voltage reference and reducing the distortion of the line current waveform at said input port with respect to the line voltage waveform at said input port.

* * * * *